(12) United States Patent
Derand et al.

(10) Patent No.: US 7,553,393 B2
(45) Date of Patent: Jun. 30, 2009

(54) METHOD FOR COVERING A MICROFLUIDIC ASSEMBLY

(75) Inventors: Helene Derand, Taby (SE); Anders Larsson, Bromma (SE)

(73) Assignee: Gyros AB, Uppsala (SE)

( * ) Notice: Subject to any disclaimer, the term of this patent is extended or adjusted under 35 U.S.C. 154(b) by 618 days.

(21) Appl. No.: 10/182,792

(22) PCT Filed: Jan. 22, 2001

(86) PCT No.: PCT/EP01/00653

§ 371 (c)(1),
(2), (4) Date: Jul. 30, 2002

(87) PCT Pub. No.: WO01/54810

PCT Pub. Date: Aug. 2, 2001

(65) Prior Publication Data

US 2003/0029724 A1 Feb. 13, 2003

(30) Foreign Application Priority Data

Jan. 30, 2000 (SE) .................................. 0000300

(51) Int. Cl.
*B29C 65/00* (2006.01)
(52) U.S. Cl. ...................... 156/292; 422/100; 422/101; 422/99; 156/308.2; 156/309.6; 436/180
(58) Field of Classification Search ................. 436/180; 422/99–101; 156/292, 308.2, 309.6
See application file for complete search history.

(56) References Cited

U.S. PATENT DOCUMENTS

| | | | | |
|---|---|---|---|---|
| 3,553,067 | A | * | 1/1971 | Dwyer et al. .................. 428/77 |
| 5,376,252 | A | | 12/1994 | Ekstrom |
| 5,690,841 | A | | 11/1997 | Elderstig |
| 5,698,363 | A | * | 12/1997 | Katsuda et al. .............. 430/200 |
| 5,773,488 | A | | 6/1998 | Allmer |
| 5,885,527 | A | * | 3/1999 | Buechler ...................... 422/58 |
| 5,962,081 | A | | 10/1999 | Ohman |
| 5,995,209 | A | | 11/1999 | Ohman |
| 6,126,765 | A | | 10/2000 | Ohman |
| 6,144,447 | A | | 11/2000 | Ohman |
| 6,176,962 | B1 | * | 1/2001 | Soane et al. ................. 156/292 |
| 6,192,768 | B1 | | 2/2001 | Wallman |
| 6,203,291 | B1 | | 3/2001 | Stemme |
| 6,322,682 | B1 | | 11/2001 | Arvidsson |
| 6,375,871 | B1 | * | 4/2002 | Bentsen et al. ............... 264/1.6 |
| 6,454,970 | B1 | | 9/2002 | Ohman |
| 6,620,478 | B1 | | 9/2003 | Ohman |
| 6,632,656 | B1 | | 10/2003 | Thomas et al. |
| 6,653,625 | B2 | | 11/2003 | Andersson |
| 6,717,136 | B2 | | 4/2004 | Andersson |
| 6,728,644 | B2 | | 4/2004 | Bielik |
| 6,811,736 | B1 | | 11/2004 | Ohman |
| 6,812,456 | B2 | | 11/2004 | Andersson |
| 6,812,457 | B2 | | 11/2004 | Andersson |
| 6,855,329 | B1 | * | 2/2005 | Shakesheff et al. ......... 424/409 |
| 2003/0044322 | A1 | | 3/2003 | Andersson |
| 2003/0047823 | A1 | | 3/2003 | Ohman |
| 2003/0053934 | A1 | | 3/2003 | Andersson |
| 2003/0054563 | A1 | | 3/2003 | Ljungstrom |
| 2003/0082075 | A1 | | 5/2003 | Agren |
| 2003/0094502 | A1 | | 5/2003 | Andersson |
| 2003/0129360 | A1 | | 7/2003 | Derand |
| 2003/0156763 | A1 | | 8/2003 | Soderman |
| 2003/0211012 | A1 | | 11/2003 | Bergstrom |
| 2003/0213551 | A1 | | 11/2003 | Derand |

(Continued)

FOREIGN PATENT DOCUMENTS

WO    WO 91/16966    11/1991

(Continued)

OTHER PUBLICATIONS

McCormick et al. Microchannel Electrophoretic Separations of DNA in Injection-Molded Plastic Substrates; Anal Chem, 1997, 69, 2626-2630.

(Continued)

*Primary Examiner*—Jill Warden
*Assistant Examiner*—Jyoti Nagpaul
(74) *Attorney, Agent, or Firm*—Fulbright & Jaworski LLP

(57) ABSTRACT

A method for covering a set of open microchannel structures which are fabricated on a planar surface made of plastics and which comprise two or more part areas that have different surface characteristics. The method comprises the steps of: a) providing the surface comprising the set of microchannel structures; b) providing a lid-forming sheet having on one side an even layer of a thermoglue; c) applying the side of the sheet having the thermoglue against the surface carrying the microchannel structure; d) heating the assembly created in step (c) to selectively liquefy the hot-melt adhesive while at the same time pressing the sheet material and the planar surface of the substrate together; e) permitting the resulting laminate-covered microchannel structure to cool. An assembly comprising (a) a planar substrate, the surface of which has a set of one or more open microchannel structures each of which comprises part areas representing different functionalities, and (b) a lid-forming material covering said set of microchannel structures and having one or more openings going from a microchannel structure to ambient atmosphere. The assembly is characterized in that the joint between said surface and said sheet material is a thermoglue that possibly has been cured.

9 Claims, No Drawings

U.S. PATENT DOCUMENTS

| | | |
|---|---|---|
| 2003/0231312 A1 | 12/2003 | Sjoberg |
| 2004/0058408 A1 | 3/2004 | Thomas |
| 2004/0096867 A1 | 5/2004 | Andersson |
| 2004/0099310 A1 | 5/2004 | Andersson |
| 2004/0120856 A1 | 6/2004 | Andersson |
| 2004/0202579 A1 | 10/2004 | Larsson et al. |

FOREIGN PATENT DOCUMENTS

| | | |
|---|---|---|
| WO | WO 94/29400 | 12/1994 |
| WO | WO 98/45693 | 10/1998 |
| WO | WO 99/56954 | 11/1999 |
| WO | WO 99/58245 | 11/1999 |

OTHER PUBLICATIONS

U.S. Appl. No. 09/937,533, Larsson et al.
U.S. Appl. No. 10/169,056, Andersson et al.
U.S. Appl. No. 10/276,282, Larsson et al.
U.S. Appl. No. 10/402,138, Kylberg et al.
U.S. Appl. No. 09/958,577, Ulfendahl.
U.S. Appl. No. 09/869,554, Orlefors et al.
U.S. Appl. No. 09/830,475, Stjernstrom.
U.S. Appl. No. 10/168,942, Tooke et al.
U.S. Appl. No. 10/957,452, Ekstrand et al.
U.S. Appl. No. 10/070,912, Ohman et al.
U.S. Appl. No. 10/402,137, Kylberg et al.
U.S. Appl. No. 10/030,297, Derand et al.
U.S. Appl. No. 10/924,151, Tooke et al.
U.S. Appl. NO. 10/513,084, Holmquest et al.
U.S. Appl. No. 09/937,533, Derand et al.
U.S. Appl. No. 10/999,532, Ostlin et al.
U.S. Appl. NO. 10/867,893, Derand et al.
U.S. Appl. No. 11/017,252, Derand et al.
U.S. Appl. No. 10/450,177, Ohman et al.
U.S. Appl. No. 10/129,032, Tormod.
U.S. Appl. No. 09/674,457, Larsson et al.
U.S. Appl. No. 10/069,827, Derand et al.
U.S. Appl. No. 10/244,667, Agren.
U.S. Appl. No. 10/849,321, Fielden et al.
U.S. Appl. No. 10/111,822, Tooke et al.

* cited by examiner

METHOD FOR COVERING A MICROFLUIDIC ASSEMBLY

TECHNICAL FIELD

The invention concerns a method for tightly covering a set of open microchannel structures manufactured in the surface of a planar substrate made of plastics. The cover is typically a lid. The invention also concerns a microfluidic device, which can be obtained by the method and in which a lid covers the microchannel structures. Different parts in the microchannel structures of the invention represent different functionalities. The surface characteristics of the parts may differ. See below.

The primary use of the device is in analytical and preparative systems in which a flow of an aqueous liquid transports one or more reagents and/or sample (containing one or more analytes) from one part of the structure to another. See below. Preparative systems include separations, synthesis etc.

BACKGROUND PUBLICATIONS

In the early work within the field of the invention a large part of published work concerns microstructures made in silicon materials. Microfabricated structures made in silicon materials are often relatively easy to process further without harmful effects. In later work the material has changed to plastics.

A number of potential alternatives for adhering a lid to surfaces carrying open microchannel structures is at hand. Illustrative examples are by welding or by the use of various types of glues such as normal glues, hardening glues, thermal glues (including hot-melt adhesives) etc, each of which having their own benefits and pitfalls (WO 9845693, Aclara Biosciences; WO 9956954, Caliper Technologies). However, since the structures concerned are in the microformat and plastics surfaces often are heat-sensitive the risk for harmful changes in preformed microstructures have become significant (WO 996954, Caliper Technologies).

WO 9116966 (Amersham Pharmacia Biotech AB) discloses that sealing is accomplished by using a substrate material that is elastic, possibly in combination with gluing. Later it was suggested to use hot-melt gluing (WO 9429400, Amersham Pharmacia Biotech AB; and U.S. Pat. No. 4,957,582 Eastman Kodak). Thermolaminating a lid has been disclosed for microchannel structures that are to be used for electrophoresis (Soane et al., U.S. Pat. No. 5,858,188 and U.S. Pat. No. 6,054,034, Soane et al.; and McCormick et al., Anal. Chem. 69 (1997) 2626-2630).

These publications are directed towards microchannel structures in which the surface area in each individual structure is essentially homogeneous with respect to surface properties. Many times the structure has in principle only been intended to have one function (mass transportation) and the surfaces have had the initial hydrophobic/hydrophilic balance of the material used.

During the last years, the interest has focused on more complex structures in which there have been significant differences in surface characteristics between different parts of individual microchannel structures (so-called patterned microstructure surfaces). See for instance WO 9955827, WO 9958245, SE 9901100-9, and SE 9904802-7. It has become important to have simple, reproducible and reliable production methods for the manufacture of this kind of microfluidic devices.

The present invention is focusing on covering preprepared sets of open microchannel structures having parts that differ in surface characteristics. By the use of the invention the need for postdevelopment of surface characteristics in covered microchannel structures can be minimized.

Difficulties Encountered when Going from the Macroformat to the Microformat.

The nature of the difficulties often changes drastically to the worse, if miniaturising a macroscale system to a microscale system. Systems become more sensitive for evaporation and leakage, for instance. The demand on intra- and interset reproducibility in the manufacturing becomes more stringent. An acceptable deviation in the macroformat may become a functional disaster in the microformat. An acceptable physical deformation or a slight deviation from the intended hydrophobicity/hydrophilicity balance in a macrosystem, for instance a valve, a liquid conduit or a reaction and/or a detection zone, may in the corresponding microsystem render it impossible to accomplish reliable analysis results.

Thermal treatment of open microchannel structures made in plastics means a considerable risk for physical deformation and undesired changes of surface characteristics. In particular, hydrophilic surfaces on hydrophobic plastic substrates (almost all practically useful plastics are inherently hydrophobic) are very sensitive to heating (F Garbassi et al: Polymer Surfaces From Physics to Technology, p 324-337, Wiley 1998). The main reason is that the mobility of the polymer chain segments increases and allows for reorganisation of the surface so that polar hydrophilic groups turn inwards and nonpolar hydrophobic groups turn outwards.

Further the covered microchannel structures should resist pressure differences due to heating liquid-filled reaction chambers and the like. In microsystems the the mechanical stress levels involved may be greater than in macrosystems.

OBJECTIVES OF THE INVENTION

A first objective is to provide a method for reproducibly and leak-proofly covering a set of microchannel structures as defined above without significantly changing the characteristics of different part areas present therein. In particular the objective is to avoid undesired inter-structure variability or inter- or intraset variability, i.e. to manufacture predetermined sets of microchannel structures with a high reproducibility.

A second objective is to provide a method as defined above that is cheap to perform and fitted to mass manufacturing of sets of covered microchannel structures.

A third objective is to provide covered microchannel structures as defined above. This objective in particular relates to microchannel structures in which there is a set of delineated hydrophilic part areas that have a water-contact angle that is $\leq$ below 30°, such as $\leq$25° or $\leq$20°. This objective also comprises that there may be hydrophobic part areas, for instance with a water-contact angle that is >30° such as >40°, for instance delineating individual hydrophilic part areas from each other. One kind of hydrophobic areas are various forms of hydrophobic breaks within a microchannel structure.

A fourth objective is a covering method for open microchannel structures that are easy to automate and that minimize the need for introducing different surface characteristics in different parts after the microchannel structures have been covered. A fifth objective is to provide covered microchannel structures, in which channel surfaces have a sufficient hydrophilicity for water to penetrate the channels by self-suction.

THE INVENTION

After having tried a number of alternatives, we have now discovered that these difficulties and objectives can be complied with for microchannel structures as defined above if the cover and substrate materials, glue and application of heat are properly matched. Thus the first aspect of the present invention is a method for covering a set of microchannel structures of the kind defined above and in which each microchannel structure have parts with differentially functionalized surfaces and differential surface characteristics. The characteristic features of the method comprises:

(a) providing a substrate made of plastics and having at least one planar surface in which a set of microchannel structures has been fabricated;
  (b) providing a lid-forming material having on one side an even layer of a thermoglue;
  (c) applying the side of the sheet material having the thermoglue against the surface carrying the microchannel structure to thereby also cover said microchannel structure;
  (d) heating the assembly created in step (c) to selectively liquefy the thermoglue while at the same time pressing the sheet material and the planar surface of the substrate together;
  (e) permitting the resulting laminate-covered microchannel structure to cool down below the liquefying temperature of the thermoglue.

Either before or after steps (c)-(e), the substrate and/or lid-forming material may be provided with openings providing communication between the ambient atmosphere and a microchannel structure. These openings may function as vents and/or application areas for reagents samples and liquids. The openings may be dot- or line-like (straight, bend, annular etc) etc.

A second aspect of the invention is an assembly comprising (a) a planar substrate the surface of which has a set of one or more open microchannel structures each of which comprises part areas representing different functionalities, and (b) a lid covering said set of microchannel structures. The characterizing feature is that said surface and said sheet material stick to each other by the use of a hot-melt adhesive, that possibly have been cured. The surface, microchannel structures, part areas, lid-forming material, hot-melt adhesive etc may be as defined elsewhere herein.

A third aspect of the invention is the use of the set of microstructure channels of the invention in analytical and/or preparative processes.

Thermoglue and Gluing as Carried Out in the Invention.

In step (c) the temperature is preferably below the liquefying temperature of the thermoglue. ($T_m$). In the alternative, steps (c) and (d) may coincide.

During step (d) the thermoglue shall melt and create a molecular contact between the thermoglue and the planar substrate surface.

In step (d) the temperature of the thermoglue is increased so that it turn into a more or less viscous liquid enabling gluing (gluing temperature). The liquefying temperature often encompasses an interval during which the viscosity of the thermoglue gradually is decreased. The interval encompasses what is normally called the melting point ($T_m$) of a thermoglue. A general guideline thus is that the temperature of the thermoglue should be increased to at least the liquefying temperature of the thermoglue. Another important aspect of the heating is that it should be performed in such a way that unnecessarily softening of the substrate plastics is avoided because then the microchannel structures may become deformed. A second general guideline thus is to maintain the temperature of the planar surface and the underlying layer below or close to the heat deflection temperature of the plastics from which the substrate surface is made. This guideline corroborates that in many cases the heat deflection temperature of the plastics should be higher than the liquefying temperature of the thermoglue. If the thermoglue and substrate surface have been otherwise selected, it may be important that the plastics has a low heat conductivity and/or to carry out the heating under an extremely short time.

The time for heating is typically shorter than 5 minutes such as shorter than 1 minutes or shorter than 10 seconds. The time for heating may also be shorter than 1 second. The lower limit of heating times may be 1 milliseconds, such as 0.01 or 0.1 seconds or even lower such as down to 1 microsecond. The minimal time is mainly controlled by the time required for the adhesive to melt and create a molecular contact with the substrate surface. A third general guideline is that at high temperatures the time period for heating should be as short as possible in order to minimize physical deformations and the risk for changes in other surface characteristics.

The increase in temperature can be accomplished in different ways, for instance irradiation of the assembled materials (lid-forming material and plastics substrate) or applying a heating element to one planar side of the assembly. In a preferred heating system, heating is evenly applied to the lid-forming material, which in turn evenly dissipate heat to the thermoglue, which in turn may dissipate heat to the planar surface containing the microchannel structures.

The manufacturers of thermoglues often recommend suitable heating temperatures and times.

Typically thermoglues are applied as thermoplastic melts which maintain their thermoplastic properties after gluing. Their dynamic mechanical spectra encompass a glassy phase, a rubbery phase and a liquefied phase (liquid). Thermoglues that are useful in the invention typically has a glass transition temperature ($T_g$) which is about 20° C. below room temperature, and a melt/liquefying temperature, in most cases below 170° C. Information about $T_g$ and $T_m$ (melt temperature) is available from manufacturers and handbooks. If the thermoglue is cured after or during gluing the adhesive joint may lose its thermoplastic property.

Useful thermoglues may belong to either of two categories: (1) formulation-dependent and (2) synthetically designed. The former variants typically contain one or more base component and various additives. Typical base components are selected amongst polyvinyl acetate co-polyethylenes (EVA), low density polyethylenes, polyethyl acrylate-co-polyethylenes, paraffin waxes, polypropylenes, styrene-butadiene block copolymers, styrene-isoprene block copolymers, phenoxy resins etc. In type 2 variants the base component gives the gluing characteristics and has been synthetically designed to meet specific gluing demands. This means that often no additives are needed. Typical base components for type 2 variants are polymers and are selected from polyamides and polyesters.

In some applications it might be beneficial to use a curing thermoglue that re-enforces the joint between the plastics surface and the lid-forming material. Re-enforcement may take place via formation of cross-links or more importantly of covalent bonds to the plastics surface and/or to the lid-forming material).

The strength of an adhesive joint can be determined by one of many standardised test methods, e.g. peel tests, shear-lap tests, tensile butt tests or blister tests. In a highly simplified treatment, the adhesion strength depends on a) the extent of true molecular contact between the adhering surfaces, b) the extent of attractive interactions between the adherends where they are in molecular contact and c) the possibilities for viscous energy dissipation in the materials during fracture of the joint.

In the case where a liquefied adhesive is contacted with a solid substrate surface, the extent of molecular contact is governed by the wetting process. If the liquified adhesive has a low contact angle on the substrate (ideally 0 degrees but in reality also values up to 10-20 degrees), it will fill out all micro- and nanoscale crevices and other irregularities on the substrate surface and create an intimate molecular contact over the entire joint area. If the contact angle is higher, the filling of the crevices will be less complete, resulting in the formation of microvoids with no molecular contact between the adhesive and the substrate. The contact angle depends on the surface energy of the substrate (e.g. expressed as the critical surface tension), the surface tension of the liquified adhesive, the viscosity of the liquefied adhesive and on the contact time.

The attractive interactions between the solidifed adhesive and the substrate surface will typically be van der Waals forces and acid-base interactions. The total force of these interactions will usually be higher if both surfaces have a polar character (e g expressed as the critical surface tension), although exceptions may occur, especially in contact with polar liquids such as water. Where a high water resistance is needed it may sometimes be necessary to form covalent bonds between the surfaces, usually by choosing a reactive adhesive that forms covalent bonds with surface groups in the substrate during a curing process.

If one or both of the adherend materials has a viscoelastic character, it may deform and take up mechanical energy by viscous dissipation. This reduces the stress levels in the interface zone and may inhibit the formation of a propagating crack leading to failure. Higher adhesion strength levels may thus be observed, particularly in short-term adhesion tests. In long-term tests the strength values may sometimes be lower due to cohesive creep failure in the viscoelastic material.

General information regarding selection and use of thermoglues/hot-melt adhesives can be find in text-books, for instance Chapter 10 in Adhesion and Adhesives Technology (ed. Alphonsus V. Pocius, Hancer/Gardner Publications Inc, Cincinnati (1997), in particular Chapter 10, pages 246-260).

Lid-forming Material

This material is not critical as long as it is compatible with the thermoglue, heating principle etc. The lid-forming material is typically in form of a laminated sheet and relatively thin compared to the substrate comprising the microchannel structures, for instance less than 10%. One of the outer layers in useful laminate sheet materials is always a thermoglue. The other one or more layers are typically made of plastics, a metal foil etc. Useful plastics are based on the same kinds of polymers that can be used in the plastics of the planar surface comprising the micro-channel structures. Also other kinds of materials are possible.

On the side of the material opposite to the thermoglue layer, there may be imprinted instructions for use and the like and other information from the manufacturer. Typically there may be arrows showing he intended flow directions and an inviting mouth encompassing each opening which is intended as application areas for reagents, liquids, samples and/or the like.

The Plastics Material of the Planar Surface.

Typically the plastics material is based on a polymer which has been obtained by polymerisation of monomers comprising unsaturation such as in carbon-carbon double bounds or carbon-carbon-triple bonds.

The monomers may, for instance, be selected from mono-, di and poly/oligo-unsaturated compounds, e.g. vinyl compounds and other compounds containing unsaturation. Illustrative monomers are:
  (i) alkenes/alkadienes (such as ethylene, butadiene, propylene and including substituted forms such as vinyl ethers), cycloalkenes, polyfluorovinyl hydrocarbons (for instance tetrafluoroethylene), alkene-containing acids, esters, amides, nitriles etc for instance various methacryl/acryl compounds; and
  (ii) vinyl aryl compounds (such as mono-, di- and trivinyl benzenes) that optionally may be substituted with for instance lower alkyl groups (C1-6) etc.

Another type of useful plastics are based on condensation polymers in which the monomers are selected from compounds exhibiting two or more groups selected among amino, hydroxy, carboxy etc groups. This kind of plastics is typically polycarbonates, polyamides, polyamines, polyethers etc. Polyethers include the corresponding silicon analogues, such as silicone rubber.

The polymers of the plastics may be in cross-linked form. The plastics may be a mixture of two or more different polymer(s)/copolymer(s).

Particularly interesting plastics are those that have a non-significant fluorescence for excitation wavelengths in the interval 200-800 nm and emission wavelengths in the interval 400-900 nm. By non-significant fluorescence is meant that the fluorescence intensity in the above-given emission wavelength interval should be below 50% of the fluorescence intensity for a reference plastics (=a polycarbonate of bisphenol A without fluorescent additives). In fact it does not harm in case the fluorescence intensity of the plastics is even lower, such as <30% or <15%, such as <5% or <1%, of the fluorescence intensity of the reference plastics. Typical plastics having an acceptable fluorescence are based on polymers of aliphatic monomers containing polymerizable carbon-carbon double bonds, such as polymers of cykloalkenes (e.g. norbornene och substituterade norbornenes), ethylene, propylenes etc, as well as other non-aromatic polymers of high purity, e.g. certain grades of polymethylmethacrylate.

Microchannel Structures

Each set of microchannel structures comprises one, two or more, such as more than five, microchannel structures. The structures are in the microformat by which is meant that the structures comprises one or more cavities and/or channels which have a depth and/or width that is $\leq 10^3$ µm, preferably $\leq 10^2$ µm. The structures of a set extend in the surface of the planar substrate material. There may be extension channels providing liquid communication between individual microchannel structures of a set. In addition there may be channel extensions also in other directions, primarily perpendicular to the common plane. Such other channel extensions may function as sample or liquid application openings or connections to other sets of microchannel structures that are not located in the same plane as the surface microchannel structures. Channel extensions may also be in the microformat.

In the channels of a microchannel structure the distance between two opposite walls typically is $\leq 1000$ µm, such as $\leq 100$ µm, or even $\leq 10$ µm, such as $\leq 1$ µm. The structures may also contain one or more chambers being connected to the channels and having volumes $\leq 500$ µl, such as $\leq 100$ µl and even $\leq 10$ µl such as $\leq 1$ µl. The depths of the chambers may typically be in the interval $\leq 1000$ µm such as $\leq 100$ µm such as $\leq 10$ µm or even $=1$ µm. The lower limit is always significantly greater than the largest of the reagents used. The lower limit is typically in the range 0.1-0.01 µm for devices that are to be delivered in dry form.

The bottom and/or the side-walls within a microchannel structure define a predetermined pattern of part areas. Part areas next to each other may represent discrete functionalities and differ in surface properties and/or surface geometries (including depth and width). The difference in surface properties may relate to chemical characteristics, such as differences in hydrophilicity and/or hydrophobicity, chemical compositions, in reactivity such as participating in covalent bond formation or affinity reactions, etc. Thus there may be one or more discrete functional parts selected among: a) application chamber/cavity/area, b) conduit for liquid transport, c) reaction chamber/cavity; d) volume defining unit; e) mixing chamber/cavity; f) chamber for separating components in the sample, for instance by capillary electrophoresis, chromatography and the like; g) detection chamber/cavity; h) waste conduit/chamber/cavity; i) internal valve; j) valve to ambient atmosphere; etc. Many of these parts may have more than one functionality. There may also be collecting chambers/cavities in which a compound, which has been separated, formed or otherwise processed in a microchannel structure are collected and transferred to some other instrument, for instance an analytical instrument such as a mass spectrometer.

Certain functional parts, for instance reaction cavities and/or detection areas, may have bottoms that in turn are divided into a plurality of subpart areas, each of which may represent different chemical or biochemical reactivities (reaction zones or detection zones).

Around this kind of reaction and/or detection subpart areas there may be delineating inert areas in order to minimise "over-hearing" between closely located subpart areas.

When the structure is used, necessary reagents and/or the sample including the analyte are applied to an application area and transported downstream in the structure by an applied liquid flow. As an alternative, reagents may have been incorporated in advance in one or more predetermined part areas of the structure. The liquid flow may be driven by capillary forces, an/or centripetal force, pressure differences applied externally over a microchannel structure and also by other non-electrokinetic forces that are externally applied and cause transport of the liquid and the analytes and reagents in the same direction. Also electroendoosmosis may be utilized for creating the liquid flow. The liquid flow is thus transporting reagents and analytes and other constituents from the application area/cavity/chamber into a sequence of preselected parts (b)-(j). A typical sequence comprises liquid flow and transport from an application part area via a reaction and/or a detection part area and finally to a waste.

The liquid flow may be paused when a reagent and/or analyte have reached a preselected part in which they are subjected to a certain procedure, for instance capillary electrophoresis in a separation part, a reaction in a reaction part, detection in a detection part etc.

The microfluidic device may be disc-formed of various geometries, with the round form being the preferred variant (CD-form).

In the round form, the microchannel structures may be arranged radially with an intended flow direction from an inner application area radially towards the periphery of the disc. In this variant the most practical way of driving the flow is by capillary action, centripetal force (spinning the disc).

It is believed that the preferred variants of the inventive microfluidic devices will be delivered to the customer in a dried state. The surfaces of the microchannel structures of the device therefore should have a hydrophilicity sufficient permitting penetration of water by self-suction from application areas into the channels of the structures.

Applications in Which the Inventive Microfluidic Assembly Can be Used.

Typical analytical systems in which the microfluidic assembly described herein may comprise as the main steps one or more of (a) sample preparation, (b) assay reactions and (c) detection. Sample preparation means the preparation of a sample in order to make it suitable for the assay reactions and/or for the detection of a certain activity or molecular entity. This may for example mean that substances interfering with the assay reactions and/or detection is removed or otherwise neutralized, that substances are amplified and/or derivatized etc. Typical examples are amplifying one or more nucleic acid sequences in a sample, for instance by polymerase chain reaction (PCR), removing of species cross-reacting with an analyte in assays involving affinity reactions etc. Typical assay reactions are reactions involving cells, affinity reactions, for instance biospecific affinity including immune reactions, enzymatic reactions, hybridization/annealing etc, precipitation reactions, pure chemical reactions involving formation or breaking up of covalent bonds and many others. The detection reaction may involve fluorometry, chemiluminometry, mass spectrometry, nephelometry, turbidometry etc. The applicable analytical systems may thus comprise affinity assays, such as immune assays, hybridisation assays, cell biology assays, mutation detection, genome characterisation, enzyme assays, screening assays for finding new affinity pairs etc. Methods for the analysis of sample content of proteins, nucleic acids, carbohydrates, lipids and other molecules with particular emphasis of other bio-organic molecules are also included.

The microfluidic assembly of the present invention may also find use for the set up of libraries of compounds including synthetic peptide and oligonucleotide libraries, for instance by solid phase synthesis. The synthesis of so called combinatorial libraries of compounds is also included.

The invention will now be illustrated by patent examples constituting proof of principle without therefore limiting the scope of the invention. The invention is further defined in the appended patent claims.

EXPERIMENTAL PART

Example 1

Physical Stability of Microchannel Structures and Stability of Surface Hydrophilicity A CD disc made from polycarbonate (polycarbonate of Bisphenol A, Macrolon DP-1265, Bayer AG, Germany), having recessed microfabricated channels on the surface, was placed in a plasma reactor (Plasma Science PS0500 from BOC Coating Technology, Concord Calif. USA) and treated with an oxygen plasma (5cm$^3$/min gas flow, 500 W RF power) for 10 min. The width and depth of channels and cavities varied along the structure but were in the range of 15-100 µm. After this treatment the disc surface had a water contact angle below 6 degrees. A lid (MA 020 060, Lawson Mardon Packaging) consisting of two polymer layers, 55 m poly(ethylene terephalate) and a heat seal layer, was then placed on top of the disc. The sealing of the CD and the lid was performed using a "Hot stamping and Pod pinning system" (Model US 75, head size 12"×24") from United silicon, Lancaster, N.Y. U.S.A with the temperature set on 150° C. and the impuls time on 0.05 sec. Holes were then made in the lid, in each end of a microstructure. An aqueous solution was introduced to the channels. The solution penetrated the microstructure by self-suction. This showed that the hydrophilicity induced by the plasma treatment was essentially unchanged. No disturbing physical deformation or change in hydrophilic-hydrophobic balance of the channel surfaces could be detected.

Example 2

Retaining Characteristics of Part Areas of Different Hydrophilicity and Hydrophobicity, Respectively A CD disc made from polycarbonate (polycarbonate of Bisphenol A, Macrolon DP-1265, Bayer AG, Germany), having recessed microfabricated channels on the surface, was placed in a plasma reactor (Plasma Science PS0500 from BOC Coating Technology, Concord Calif. USA) and treated with an oxygen plasma (5cm$^3$/min gas flow, 500 W RF power) for 10 min. The width and depth of channels and cavities varied along the structure, but were in the range of 15-100 μm. After this treatment the disc surface had a water contact angle below 6 degrees. A perflourinated polymethacrylate solution (FC 732, 3M) was then applied locally at selected spots and left to dry in. A lid consisting of two polymer layers, 50 μm poly(ethylene terephthalate) and 15 μm thick seal-layer of modified poly(ethylene terephthalate) (Skultuna Flexible, Skultuna, Sweden), was then placed on top of the disc. The sealing of the CD and the lid was performed using a a "Hot stamping and Pod pinning system" (Model US 75, head size 12"×24") from United Silicon, Lancaster, N.Y. U.S.A with the temperature set to 150° C. and the impulse time on 0.05 sec. Holes were then made in the lid at desired spots along the microstructure. An aqueous solution was introduced to the channels. The solution penetrated by self-suction into the hydrophilic channel areas, but stopped at the hydrophobic masked areas. This showed that the hydrophilic and hydrophobic areas respectively sufficiently retained their properties during the sealing procedure. No disturbing physical deformation of the channel surfaces could be detected.

The invention claimed is:

1. A method for the manufacture of a microfluidic device by covering a set of open microchannel structures which are fabricated in the surface of a planar substrate, wherein the method comprises the steps of:
   (a) providing the planar substrate comprising a set of microchannel structures, wherein the planar substrate is made of plastic and comprises a microchannel having two or more part areas where a first part area has the surface characteristic that it is more hydrophilic than the second part area;
   (b) providing a lid-forming material having on one side an even layer of a thermoglue;
   (c) applying the side of the lid-forming material having the thermoglue against a surface carrying the microchannel structures to thereby cover said microchannel structures creating an assembly;
   (d) heating the assembly created in step (c), at least to a temperature that selectively liquefies the thermoglue but less than the heat deflection temperature of the planar substrate, for less than about 5 minutes while at the same time pressing a sheet material and the planar surface of the substrate together; and
   (e) permitting the resulting assembly to cool below the liquefying temperature of the thermoglue
   wherein the first part area retains the surface characteristic that it is more hydrophobic than the second part area.

2. The method claim 1, wherein said thermoglue is a hot-melt adhesive.

3. The method of claim 1, wherein the channels in the microchannel structure have a sufficient hydrophilicity to permit self-suction.

4. The method of claim 1, wherein the heating step is applied to the lid-forming material.

5. The method of claim 1, wherein heating is applied for less than one second.

6. The method of claim 1, wherein said set comprises two or more microchannel structures.

7. The method of claim 1, wherein said two or more part areas comprise a hydrophobic break in each microchannel structure.

8. The method of claim 1, wherein the need for postdevelopment of the surface characteristics of said microchannel structures is minimized.

9. The method of claim 1, wherein the hydrophilicity has been induced by plasma treatment.

* * * * *